Aug. 2, 1960 M. MONTALVA-CALDERON 2,947,202
TORQUE CONVERTER
Filed March 13, 1956 2 Sheets-Sheet 1

INVENTOR
Miguel Montalva-
Calderon
BY
Wenderoth, Lind & Ponack
ATTORNEYS

Aug. 2, 1960    M. MONTALVA-CALDERON    2,947,202
TORQUE CONVERTER
Filed March 13, 1956    2 Sheets-Sheet 2

INVENTOR
Miguel Montalva-
Calderon
BY Wenderoth, Lind & Ponack
ATTORNEYS

United States Patent Office 2,947,202
Patented Aug. 2, 1960

2,947,202

TORQUE CONVERTER

Miguel Montalva-Calderon, Avenida Miguel Claro No. 638, Santiago, Chile

Filed Mar. 13, 1956, Ser. No. 571,274

5 Claims. (Cl. 74—751)

The present invention relates to a novel type of torque converter for a substantially constant velocity internal combustion engine.

It is an object of the present invention to provide a torque converter which is particularly useful between a substantially constant velocity internal combustion engine and a load which has sudden fluctuations.

It is a further object of the present invention to provide a torque converter in which a flywheel is incorporated to produce desirable output and efficiency characteristics.

Other and further objects of this invention will become apparent from the following specification and claims taken together with the accompanying drawings in which:

Figure 1:
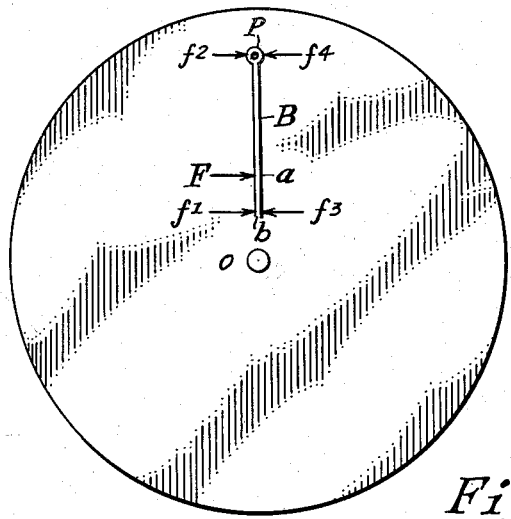
Figure 1 is a diagrammatic view of a flywheel having an arm pivoted thereto.
Figure 2:
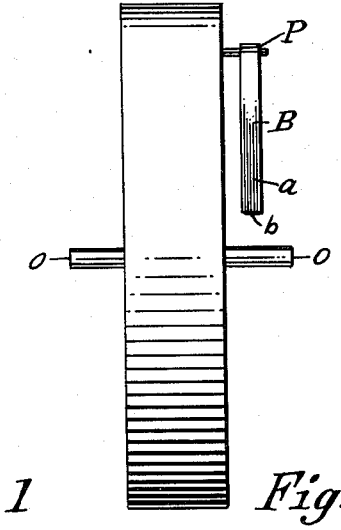
Figure 2 is a side view of the flywheel of Figure 1.

In order that the principles upon which the present invention is constructed and on which it operates may be clearly understood, the behavior of a flywheel as shown in Figs. 1 and 2 will be considered. The flywheel V has been mounted on a shaft O—O, and is freely rotatable thereon. Adjacent the periphery of the flywheel is a pivot P on which has been pivoted an arm B which is freely rotatable on the pivot P.

If there is applied to the point $a$ on the arm B a force F, and there is applied to the free end of the arm B at the point $b$ a resistance force $f_3$, the force F will be resolved into the force $f_1$ applied to the point $b$ in opposition to the force $f_3$, and the force $f_2$ at the pivot P. It will be obvious that the magnitude of the forces $f_1$ and $f_2$ are dependent on the magnitude of the force F and on the distances $a$—$b$ and $a$—P.

If the resistance force $f_3$ is small in relation to the force F, the component $f_1$ applied opposite the force $f_3$ will easily overcome the force $f_3$ and the resultant force will cause the arm B to revolve around the pivot P. The flywheel V will not move.

If, on the other hand, a large resistance force $f_3$ is applied, which resistance force is substantially equal to or greater than component force $f_1$ of the force F, the component force $f_2$ will act at the pivot P to overcome the force $f_4$ representing the resistance of the flywheel, and the resultant force will cause the flywheel to revolve.

If the force $f_2$ is maintained on the pivot P the flywheel will accelerate at a rate depending upon its mass.

Since the magnitude of the component forces $f_1$ and $f_2$ depend on the distances $a$—P and $a$—$b$, if the force F is applied near the point P, the component force $f_2$ will be larger, and if force F is applied close to $b$, the component force $f_2$ will be smaller. When the force F is applied at $b$, the component $f_2$ will be zero, and the flywheel will not move regardless of the magnitude of the forces F and $f_3$.

What has been stated above applies when the flywheel is at rest as well as when the flywheel and the arm B are revolving around the shaft O—O at a uniform velocity. Any magnitude of the component $f_2$ which is greater than the resistance force $f_4$ will serve to accelerate the flywheel, and conversely if the component $f_2$ falls below the magnitude of the resistance force $f_4$, the flywheel will decelerate.

Figure 3:
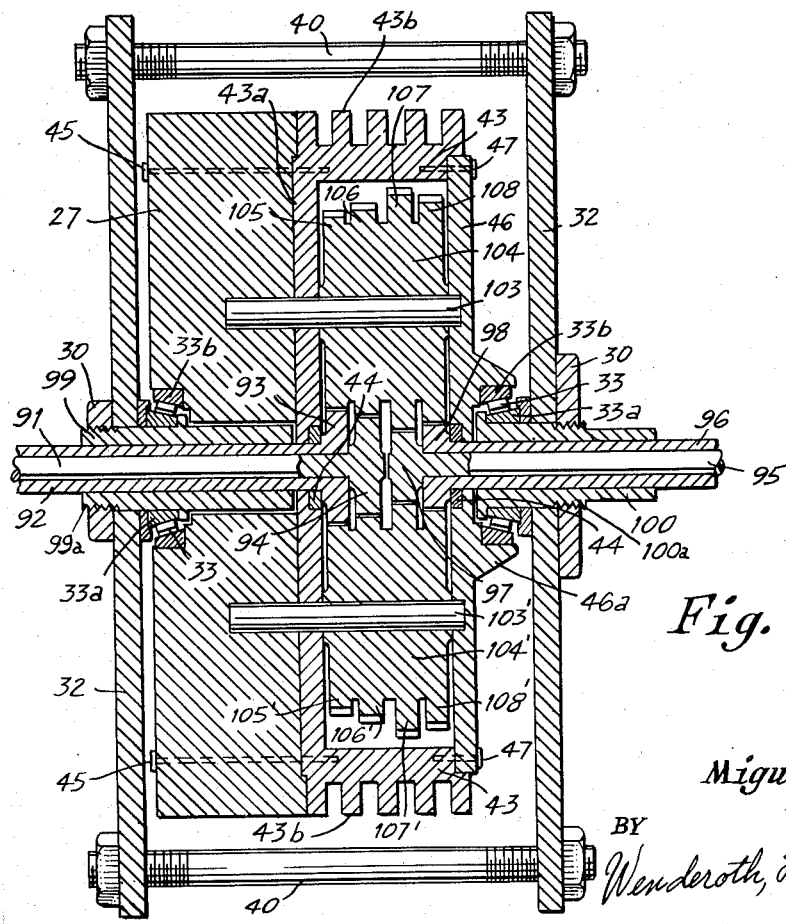
Figure 3 is a vertical axial section of the torque converter according to the present invention.

Applicant has embodied the above principles in an operable mechanism which functions in the same manner as the simple mechanism above described. As seen in Fig. 3, the device comprises a double input shaft 91 and 92, the shaft 92 being hollow and concentric about input shaft 91. On the end of input shaft 91 is pinion 94 and on the end of the hollow concentric input shaft 92 is pinion 93. Aligned with the double input shaft is a double output shaft having a central output shaft 95 and a hollow concentric output shaft 96 surrounding the shaft 95. On the inner end of output shaft 95 is pinion 97 and on the end of output shaft 96 is pinion 98. Sleeves 99 and 100 are provided and surround the hollow concentric shafts 92 and 96. Around the sleeve 99 is mounted an end frame member 32 which is held on the sleeve by a retaining nut 30 threaded onto threaded portion 99a. Mounted on sleeve 99 on the opposite side of frame member 32 from the retaining nut 30 is roller bearing 33 having a bearing race 33a attached to the sleeve.

A sleeve 100 surrounds the output shafts 95 and 96 and has a threaded portion 100a on one end thereof. Mounted on the sleeve 100 is a second frame member 32 identical with frame member 32 mounted on sleeve 28. The second frame member 32 is held on sleeve 100 by a second retaining nut 30 threaded onto the threaded portion 100a of sleeve 100. Mounted on the sleeve 100 on the opposite side of the frame member 32 from retaining nut 30 is a second roller bearing 33 having a bearing race 33a secured to the sleeve 100. Frame members 32 are spaced from each other by spacing bolts 40.

Surrounding the end of the sleeve 99 which projects towards the pinions 93 and 94 is flywheel 27 which is mounted on the roller bearing 33 by means of bearing race 33b which is fixed to flywheel 27. Surrounding the pinions 93, 94, 97 and 98 is a gear casing which consists of a cylindrical casing 43 having an end wall 43a integral therewith and a cover plate 46. End wall 43a has a circular opening therein around the input shafts 91 and 92, and there is inserted between the end wall 43a and the input shafts a packing member 44. The cylindrical casing 43 is secured to the flywheel 27 by bolts 45. Secured over the end of the gear casing 43 opposite end wall 43 is the cover plate 46 which also has a circular opening therein around the output shafts 95 and 96. A second packing member 44 is positioned between the cover plate 46 and the output shafts. Cover plate 46 is secured to the cylindrical casing 43 by means of bolts 47. The cover plate further has an annular projection 46a projecting outwardly around the opening in which packing member 44 is positioned, and mounted within the annular projection 46a is a second bearing race 33b. Cover plate 46 is thus mounted on the sleeve 100 by means of the second roller bearing 33. The gear casing assembly with its cylindrical casing 43 and cover plate 46 and the flywheel 27 to which the gear casing assembly is bolted are thus mounted rotatably on the input shafts 91 and 92 and the output shafts 95 and 96 by means of the roller bearings 33. The space within the gear casing is sealed by the packing members 44.

Within the gear casing assembly are mounted a plurality of planetary gears. Shafts 103 and 103' are mounted diametrically oppositely to each other in the gear casing, and have mounted thereon planetary gears 104, 104'. Each planetary gear 104 consists of four individual axially aligned gears integral with each other, gear 105 meshed with pinion 93, gear 106 meshed with pinion 94, gear 107 meshed with pinion 97 and gear 108 meshed with pinion 98. Planetary gear 104' likewise has four individual axially aligned gears.

In order to describe the operation of the apparatus in relation to the device shown in Figure 1, it will be assumed that only one pair of planetary gears 106 and 107 is present and that this pair does the work of all of the pairs.

If the point $a$ of Figure 1 is considered to be the point of contact between the pinion 94 and the planetary gear 106, the point $b$ the contact between pinion 97 and the planetary gear 107, and the pivot P to be the shaft 103, the arm B will be formed by the two radii $r_3$ and $r_4$ of the planetary gears 106 and 107, which radii are situated in the line that joins the shaft 103 with the center of pinion 94, a line in which the point of contact of the pinions and the planetary gears will always remain.

The operation of the apparatus will be exactly the same as discussed with references to the device Figure 1, with the advantage that it can function continuously since it will be equivalent at all times to the device shown in Figure 1.

To fully explain the functioning of the apparatus, two dimensions will be assumed; the first where the radius $r_2$ of pinion 94 is greater than the radius $r_5$ of pinion 97, and the second where the radius $r_2$ of pinion 94 is less than the radius $r_5$ of pinion 97. The first case is illustrated in Figure 3 in which the radius $r_2$ of pinion 94 is greater than the radius $r_5$ of pinion 97.

If there is applied to the input shaft 91 a torque with an angular velocity $\omega_1$, and no resistance torque acts on the output shaft 95 and the interior resistances of the apparatus are negligible, the flywheel will not revolve and the output shaft will revolve with an angular velocity.

$$\left(\omega_1 \times \frac{r_2}{r_3} \times \frac{r_4}{r_5}\right) \quad (1)$$

where $r_2$ equals the radius of pinion 94, $r_3$ equals the radius of planetary gear 106, $r_4$ equals the radius of planetary gear 107 and $r_5$ equals the radius of pinion 97. If all the gears have the same diametrical pitch and the numbers of their teeth are $N_2$, $N_3$, $N_4$ and $N_5$ respectively, the angular velocity of the output shaft could then be expressed as $$\left(\omega_1 \times \frac{N_2}{N_3} \times \frac{N_4}{N_5} = \omega_1 \times \gamma\right) \quad (2)$$

where $$\left(\gamma = \frac{N_2}{N_3} \times \frac{N_4}{N_5}\right) \quad (3)$$

In the case where $r_2$ is greater than $r_5$, and consequently $N_2$ is greater than $N_5$, $\gamma$ will be greater than 1.

If a resistance torque is applied to the output shaft 95, it will revolve with a velocity less than $\omega_1\gamma$ depending upon the magnitude of the resistance torque. As the output shaft begins to revolve with a velocity less than $\omega_1\gamma$, the flywheel 27 begins to revolve, and its velocity will depend on the amount by which the angular velocity of the output shaft has been reduced. The relationships of the angular velocities of the input shaft, the output shaft and the flywheel may be expressed by the following formulas:

If $\omega_1$ is the angular velocity of the input shaft and the angular velocity of the output shaft $\omega_2$ is expressed as $$(\omega_2 = n\omega_1) \quad (4)$$

$n$ being a number between 0 and $\gamma$, the angular velocity of the flywheel can be expressed by $$\left(\omega = \omega_1 \times \frac{\gamma - n}{\gamma - 1}\right) \quad (5)$$

When the output shaft has a resistance torque applied thereto which prevents it from rotating, i.e. $n=0$, the flywheel will revolve at its maximum angular velocity $$\left(\omega_{\max} = \omega_1 \frac{\gamma}{\gamma - 1} = \omega_1 \times \alpha\right) \quad (6)$$

If $\alpha$ is expressed as the function of the number of teeth on the gears, the maximum angular velocity of the flywheel is represented by $$\left(\omega_{\max} = \omega_1 \times \frac{1}{1 - \frac{N_3}{N_2}\frac{N_5}{N_4}}\right) \quad (7)$$

From the foregoing it follows that for a given angular velocity of the input shaft there will be a particular angular velocity of the flywheel corresponding to each angular velocity of the output shaft. The angular velocities of the two shafts and of the flywheel are always in the same direction in the first case, in which $r_2$ is greater than $r_5$.

The angular velocity of the system of planetary gears 106 and 107 may be expressed as $$\left(\omega_p = \frac{r_5}{r_4}\alpha(1-n)\omega_1 = \frac{N_5}{N_4}\frac{\gamma}{\gamma-1}(1-n)\omega_1 = \frac{N_2}{N_3}\frac{1-n}{\gamma-1}\omega_1\right) \quad (8)$$

Thus, when $n=1$, i.e. when the angular velocity of the output shaft is equal to that of the input shaft, the planetary gears do not revolve and the flywheel revolves at the same velocity as the input shaft. This condition is equivalent to a direct connection between the input and output shafts, as is the case where there is a conventional transmission provided between the two shafts.

From Formula 8 it also follows that when $n$ is greater than 1, the angular velocity $\omega_p$ of the planetary gears is negative, or is in a direction opposite to $\omega_1$, the angular velocity of the input shaft, and when $n$ is less than 1, the angular velocity $\omega_p$ is positive or in the same direction as $\omega_1$.

This reversal of direction of rotation of the planetary gears when $n$ oscillates around 1 gives to the apparatus great stability at that velocity where $n=1$, which is equivalent to the direct connection of the input and output shafts.

The second case (not illustrated) is where the radius $r_2$ of pinion 94 is less than the radius $r_5$ of pinion 97, that is the radius of the pinion on the input shaft is less than the radius of the pinion on the output shaft. This case can be illustrated in Figure 1 by imagining point $a$ as located beneath point $b$.

All of the above formulas are valid for this case, but $\gamma$, which in this case will be called $\gamma'$, is less than 1. As in the previous case the input shaft and the output shaft revolve in the same direction.

The flywheel, however may revolve in either direction, depending upon the value of $n$.

If a torque is applied to the input shaft and no resistance torque is applied to the output shaft, the output shaft will revolve with an angular velocity $\gamma'\omega_1$, $\gamma'$ being less than 1. If the driving torque is opposed by the resistance inherent in the apparatus, the flywheel is caused to rotate by the movement of the shafts and the planetary gears, and it begins to revolve in the same direction as the input shaft. As the velocity of the flywheel increases the velocity of the output shaft also increases, the angular velocity $\omega_2$ of the output shaft will reach $\omega_1$. At this instant $n=1$ and consequently the velocity of the flywheel may be expressed as $$\left(\omega' = \frac{\gamma' - n}{\gamma' - 1}\omega_1 = \omega_1\right) \quad (9)$$

If when $n=1$ and the velocity of the flywheel equals the velocity of the input shaft, a resistance torque is applied to the output shaft, the angular velocity of the output shaft will decrease until $n$ is less than 1, and the angular velocity of the flywheel will also decrease. The velocity of the flywheel becomes $\omega'=0$ when the resistance torque reduces $n$ to the strength of $\gamma'$. If the amount of resistance torque is then further increased, the velocity of the output shaft will be further diminished, and the angular velocity of the flywheel will change direction and will increase.

When the resistance torque is sufficiently strong to stop rotation of the output shaft so that $n=0$, the flywheel will revolve with a maximum velocity expressed as $$\left(\omega'_{max}=\omega_1\frac{\gamma'}{\gamma'-1}=\omega_1\alpha'\right) \quad (10)$$

the value $\omega'_{max}$ having a negative value because $\gamma'$ is less than 1. Thus, the direction of $\omega'_{max}$ is in a direction opposite to the direction of the angular velocity of the input shaft.

From the above two cases, it is seen that when, on the one hand, a driving torque is applied to the shaft with the large pinion and the resistance force is applied to the shaft with the smaller pinion, and, on the other hand, the driving torque is applied to the shaft with the smaller pinion and the resistance torque to the shaft with the larger pinion, the relation of the values of $\gamma$ and $\gamma'$ may be expressed by the equation $$\left(\gamma'=\frac{1}{\gamma}\right) \quad (11)$$

If the relationship of the values of $\gamma$ and $\gamma'$ are substituted in the equation $$\left(\alpha'=\frac{\gamma'}{\gamma'-1}\right) \quad (12)$$

the relation between $\alpha$ and $\alpha'$ may be expressed as $$(\alpha'=-(\alpha-1)) \quad (13)$$

i.e. the maximum number of revolutions that the flywheel makes for each revolution of the input shaft is, in the first case, $\alpha$ turns, and in the second case $\alpha-1$ turns, but in the opposite direction.

In the second case, where $r_2$ is less than $r_5$, the planetary gears always turn in the opposite direction from the input shaft.

An example of how the embodiment disclosed might be used is the instance in which a torque converter is used in combination with an internal combustion engine from which the conventional flywheel has been omitted. The internal combustion engine is coupled to the input shaft 91, and the load to be driven is coupled to the output shaft 96. Shaft 95 is coupled to a braking mechanism operative during the starting of the internal combustion engine.

When the internal combustion engine is to be started, the output shaft 95 is disconnected from the load to be driven and output shaft 95 is braked. The internal combustion engine is started, and when the flywheel has commenced to rotate, the braking force is removed from the output shaft 95 and the load to be driven coupled to output shaft 96. The internal combustion engine is then accelerated and the torque converter operates as described above, all of the rotating parts then being free to rotate. Since the pinion 97 on the shaft 95 is small, the braking force required to block the output shaft is small.

In this instance, the concentric input shaft 92 is not necessary to the operation of the torque converter. However this shaft may be used in many ways, for example as an output shaft having different acceleration characteristics from the other output shafts 95 and 96.

It is of course to be understood that the number of planetary gears in any of the modifications is not limited to two diametrically opposed gears. Any symmetrical grouping will suffice, depending upon the power requirements of the torque converter and the characteristics desired to be obtained. Further, the bearings need not be roller bearings, but any equivalent bearing structures may be used which will meet the requirements of the structure as to weight to be supported by the bearings and the amount of resistance which the bearings should provide to the rotation of the relative parts.

Certain resistances are inherent in the apparatus, and include the resistance of air acting on the cooling fins 43b on the outside of the flywheel and on the flywheel itself friction of the planetary gears on their shafts, and the resistance caused by the planetary gears revolving in the oil or grease contained in the space within the gear casing. These resistances are indicated by the force $f_4$ in Figure 1 and are considered to be applied at the shaft 103 of the planetary gears.

Without these resistances, the apparatus could not overcome a resistance torque except during the acceleration of the flywheel. Once the flywheel attained its maximum velocity, the torque that could be developed in the output shaft would be practically nil.

But since the resistances do have a value, the apparatus can transmit a torque to the output shaft at a constant velocity of the flywheel. If it is necessary to alter the characteristics of the apparatus, the inherent resistances can be increased by increasing the velocity of the flywheel, adding vanes or protruding blades to the exterior of the flywheel, which vanes may also serve as fan blades to cause cooling air to flow over the device, placing a heavier oil or grease in the gear casing within which the planetary gears rotate, increasing the number of planetary gears, by placing vanes or other projections on the sides of the planetary gears, or by the modification shown in Figure 4.

Figure 4:
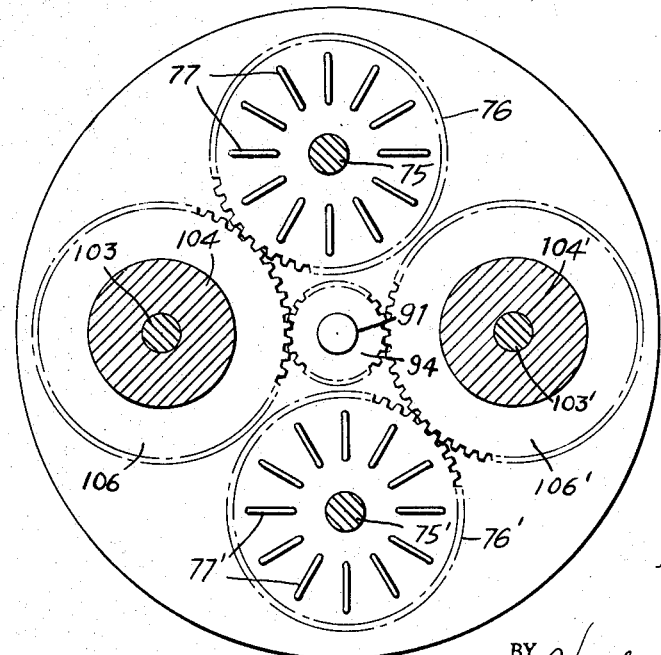
Figure 4 is a section taken along line 4—4 of Figure 3.

As seen in Figure 4, there is provided within the gear casing two further shafts 75 and 75' on which are mounted gears 76 and 76'. Gears 76 and 76' are meshed with, for example, planetary gears 106 and 106'. Provided on the face of the gears 76 and 76' are vanes 77 and 77'.

As the gears 106 and 106' are rotated by the pinion 94 on the input shaft, the gears 76 and 76' will be rotated within the gear casing. The motion of vanes 77 and 77' will be resisted by the oil or grease contained in the gear casing and will thus increase the resistance of the entire apparatus.

Figure 5:
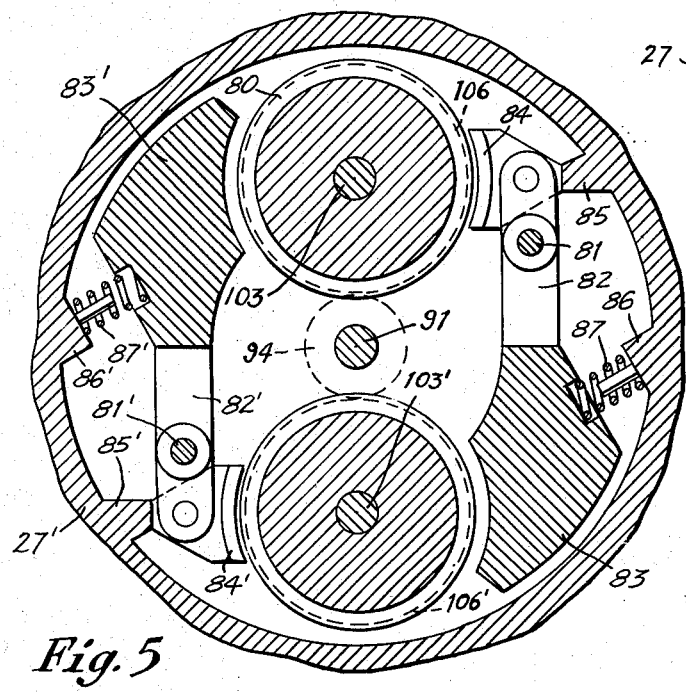
Figure 5 is a vertical axial section of a modification of the device as shown in Figure 3.
Figure 6:
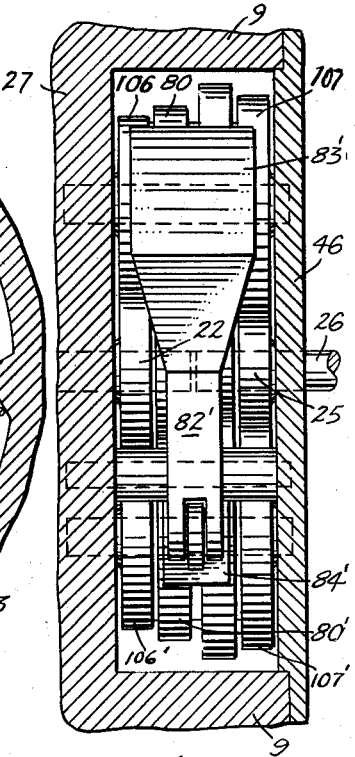
Figure 6 is a section taken along 6—6 of Figure 5.

Figures 5 and 6 show a further means for applying resistance to the planetary gears within the gear casing. Between the planetary gears 106 and 107 and 106' and 107' are positioned drums 80 and 80' which have a diameter slightly greater than the diameter of planetary gears. The drums are secured to the planetary gears and rotate together with them on the shafts 103 and 103'. A second pair of shafts 81 and 81' are mounted between the flywheel 27 and the cover plate 46 and are spaced circumferentially from the shafts 103 and 103'. Pivoted on the shafts 81 and 81' are arms 82 and 82', on one end of which are mounted weights 83 and 83', and on the opposite ends, in a position to bear against the drums 80 and 80' are pivoted brake shoes 84 and 84'. A pair of abutments 85 and 85' project from the interior of the casing adjacent the brake shoes 84 and 84', and limit the movement of the brake shoes away from the drums 80 and 80'. A second pair of abutments 86 and 86' likewise project from the wall of the casing opposite the weights 83 and 83'. Between the abutments 86 and 86' and the weights 83 and 83' are springs 87 and 87' which urge the weights away from the wall of the recess.

In operation, as the speed of the flywheel 27 increases, the mass of the weights 83 and 83' will be acted on by centrifugal force to urge them outwardly against the springs 87 and 87'. The brake shoes 84 and 84' will be pivoted toward the drums 80 and 80'. At a certain speed, the brake shoes will make contact with the drums and apply a retarding force to the planetary gears.

The advantage of this particular arrangement is that the retarding force is not applied to the apparatus until a certain predetermined speed is reached.

The relation between the resistance torque $f_3$ and the resistances $f_4$ inherent in the apparatus when the apparatus is rotating at a constant velocity may be expressed as $$\frac{f_3}{f_4} = \frac{aP}{ab} = \frac{r_3}{r_4 - r_3} \quad (14)$$

It is seen that by making the radius $r_3$ of planetary gear 106 almost as great as radius $r_4$ of planetary gear 107, a large resistance torque $f_3$ can be overcome by a relatively small value of the inherent resistances $f_4$ of the flywheel and the planetary gears.

The angular velocity of the flywheel also influences the resistance torque which may be overcome by the apparatus. This velocity may be varied by increasing the velocity of the input shaft or by a selection of the relationships between the radii of the pinions and the planetary gears in the apparatus. The relationship between the angular velocity of the flywheel and that of the input shaft may be expressed by the formula $$\omega = \omega_1 \alpha \left(1 - \frac{n}{\gamma}\right) = \omega_1 \frac{\gamma - n}{\gamma - 1} = m\omega_1 \quad (15)$$

in which $$m = \frac{\gamma - n}{\gamma - 1} \quad (16)$$

From this relationship it is seen that for a given value of $n$, the relationship between the speed of the input shaft and the speed of the output shaft, the velocity $\omega$ of the flywheel is directly proportional to $\omega_1$, and increases as $\alpha$ is increased or by causing $\gamma$ to be close to the value 1.

The relationship between the resistance torque $f_3$ and the inherent resistance forces $f_4$ can be further expressed as $$\frac{f_3}{f_4} = \frac{r_3}{r_4 - r_3} = \frac{N_3}{N_4 - N_3} = \beta \quad (17)$$

When $\beta$ is large, the force that the apparatus can transmit to the output shaft at a constant velocity is large. But, with an increase in the value of $\beta$, the flexibility of the apparatus, i.e. the ease with which the angular velocity of the output shaft may be changed in response to the variation of the resistance torque, is diminished. Reducing the value of $\beta$ thus gives more flexibility to the device. It should not be forgotten, however, that when $r_3 = r_4$, the apparatus will not function (coincidence of point $a$ and $b$ in Figure 1).

When designing an apparatus according to the invention, the normal output torque will be produced at the value $n=1$, which would be equivalent, as has been said before, to the direct connection in a conventional transmission of an automotive vehicle. In this case, the power losses are minimized since the planetary gears do not revolve and, consequently, do not produce internal friction or heat the apparatus. Only when the resistance torque increases will the planetary gears begin to function and the flywheel commence to revolve with an r.p.m. greater than the output shaft.

If the planetary gears have the largest dimensions compatible with the diameter of the flywheel and of the gear casing that contains them, their weight will contribute toward the stability of the apparatus, because they will act as small flywheels and it will be necessary to start to rotate them and hence to overcome their inertia to change their velocity.

The number of planetary gears that must be provided will depend on two factors: the power that the apparatus will transmit, and the maximum output torque that it is desired to obtain.

In order to balance the apparatus, the minimum number of planetary gears required will be two, one diametrically opposite the other. But it is possible to place three symmetrically arranged gears in one plane and place a second set of three symmetrically arranged gears in a second plane which is displaced with respect to the first plane in the direction of the output shaft of the apparatus. The planetary gears in each set must have space between them sufficient for the shafts of the planetary gears in the other set to pass between them.

If the number of planetary gears is increased, the work of the teeth of the pinions and gears is reduced. On the other hand, the friction between the planetary gears and the lubricant increases, which will increase the output torque. Thus, increasing the number of planetary gears results in a torque converter that can transmit a greater amount of power and can develop a greater output torque.

The device according to the invention may be used with an internal combustion engine, in which case, the flywheel of the engine can be eliminated, the flywheel of the torque converter serving in its place to regulate the engine. With the elimination of the engine flywheel, the cost of the combination, namely the engine and torque converter, can be reduced.

The engine flywheel can be eliminated because the flywheel of the torque converter always revolves in relation to the rotation of the input shaft at an angular velocity equal to or greater than that of that shaft. The weight of the two flywheels would also be the same.

In order to start the engine, when the engine flywheel has been eliminated, it is necessary to brake the output shaft of the torque converter. The flywheel will then revolve at a speed greater than that of the input shaft and its inertia effect will be greater than that which could be obtained with the conventional engine flywheel. But in order that the brake on the output be able to resist the output torque easily, it is necessary to start the engine at a low speed.

In order to permit acceleration of the engine immediately after starting, the brake on the output shaft is immediately released.

It has been seen that when the input shaft is provided with the largest pinion (i.e. when $r_2 > r_5$), the maximum angular velocity $\omega_1 \gamma$ of the output shaft is greater than the angular velocity $\omega_1$ of the input shaft, because $\gamma$, the relation between the radii or the number of teeth on the gears is greater than 1. From the relation between the velocities of the input and output shafts and the velocity of the flywheel expressed as $$\left(\omega = \omega_1 \times \frac{\gamma - n}{\gamma - 1}\right)$$

it is seen that an increase in the velocity of the output shaft is produced when the flywheel is braked to reduce the velocity $\omega$, because reduction of the value of $\omega$ causes $n$ to increase, the other factors remaining constant.

Under some circumstances it would be desirable to take advantage of the increase in speed of the output shaft obtained by braking the flywheel. These circumstances might occur in the case of a rapidly moving vehicle to which it is desired to give an even greater velocity and with respect to which the following conditions exist: the torque converter is functioning as a direct connection, i.e., its input shaft, output shaft, and flywheel all revolve at the same velocity; the governing action of the flywheel of the torque converter is not needed to keep the engine running because the inertia of the mass of the vehicle itself is more than sufficient; and the engine has sufficient power to increase the velocity.

In order to brake the flywheel of the torque converter, a brake may be applied to the flywheel, and may be in the form of, for example, a band applied to the surface of the flywheel, or shoes that are applied to its surface. This braking effect could also be used in certain cases to brake the flywheel and obtain a more rapid acceleration.

It is thought that the invention and its advantages will be understood from the foregoing description and it is apparent that various changes may be made in the form, construction and arrangement of the parts without departing from the spirit and the scope of the invention or sacrificing its material advantages, the forms hereinbefore described and illustrated in the drawings being merely preferred embodiments thereof.

Having thus disclosed the invention, what is claimed is:

1. A torque converter comprising at least one input shaft, at least one output shaft axially aligned with said input shaft, a sun gear on said input shaft, a sun gear on said output shaft of a different size than said sun gear on said input shaft, a gear casing, a flywheel on said gear casing, said gear casing and flywheel being rotatably mounted on said input and said output shafts with the sun gears on said input and said output shafts projecting into said gear casing, at least two planet gears in said gear casing, at least one shaft mounted on and extending through said gear casing on which said planet gears are rotatably mounted, one of said planet gears meshed only with said sun gear on said input shaft and the other of said planet gears meshed only with said sun gear on said output shaft, said planet gears rigidly joined directly to each other, a frame mounted on said input and output shafts and surrounding said flywheel and gear casing for holding said shafts, said gear casing and said flywheel in position with respect to each other, and braking means in said gear casing responsive to the speed of said torque converter and acting on said planet gears for applying a load thereto.

2. A torque converter as claimed in claim 1 in which said braking means comprise at least one further shaft mounted on and extending through said gear casing, at least one further planet gear mounted on said further shaft and meshed only with one of said two planet gears, and vanes mounted on said further planet gear projecting from said further planet gear into said casing.

3. A torque converter as claimed in claim 1 in which said braking means comprise at least one further shaft mounted on and extending through said gear casing, at least one further planet gear mounted on said further shaft and meshed only with one of said two planet gears, and vanes mounted on said further planet gear projecting from said further planet gear into said casing in the direction of the axis of said further shaft.

4. A torque converter as claimed in claim 1 in which said braking means comprise at least one additional shaft mounted on and extending through said gear casing, an arm pivoted intermediate its ends on said additional shaft, a weight on one end of said arm, spring means between said weight and said casing urging said weight away from said casing, a brake drum mounted between said planet gears, a brake shoe pivoted to the other end of said arm positioned to bear against said brake drum, and an abutment on the wall of said gear casing limiting the movement of said brake shoe away from said planet gears.

5. A torque converter comprising an input shaft having a sun gear on the end thereof, a hollow input shaft concentrically rotatably mounted around said input shaft and having a sun gear on the end thereof adjacent the sun gear on said input shaft of a different size from the sun gear on said input shaft, an output shaft axially aligned with said input shaft and having a sun gear on the end thereof adjacent said input shaft of a different size than the sun gears on said input shaft and said hollow input shaft, and a hollow output shaft concentrically rotatably mounted around said output shaft and having a sun gear on the end thereof adjacent the sun gear on said output shaft of a different size than the sun gears on said output shaft, said input shaft and said hollow input shaft respectively, a gear casing, a flywheel on said gear casing, said flywheel and gear casing rotatably mounted around said input shafts and said output shafts, said sun gears projecting into said gear casing, at least one shaft rotatably mounted on and extending through said gear casing, at least four planet gears rotatably mounted on said shaft and rigidly joined to each other, each of said planet gears meshed with only one of the sun gears on said input shafts and output shafts, a frame mounted on said input and output shafts and surrounding said flywheel and gear casing for holding said shafts, said gear casing and said flywheel in position with respect to each other, and braking means in said gear casing responsive to the speed of said torque converter and acting on said planet gears for applying a load thereto.

References Cited in the file of this patent

UNITED STATES PATENTS

| 1,037,808 | Trowbridge | Sept. 3, 1912 |
| 1,365,195 | Reeve | Jan. 11, 1921 |
| 1,752,755 | Pitt | Apr. 1, 1930 |
| 1,883,500 | Bjorndal | Oct. 18, 1932 |
| 1,997,503 | Wheeler | Apr. 9, 1935 |
| 2,085,668 | Mueller | June 29, 1937 |
| 2,123,430 | Kuehnel | July 12, 1938 |
| 2,292,079 | Joyce | Aug. 4, 1942 |
| 2,330,375 | Orner | Sept. 28, 1943 |
| 2,692,513 | Hattan | Oct. 26, 1954 |
| 2,794,350 | Hart | June 4, 1957 |

FOREIGN PATENTS

| 399,629 | Great Britain | Oct. 12, 1933 |
| 1,008,325 | France | Feb. 20, 1956 |